No. 12,014. Reissued July 15, 1902.

O. TSCHIEKY.

DOOR CHECK.

(Application filed Jan. 21, 1902.)

Witnesses,
C. W. Benjamin
H. S. Morton

Inventor,
Oscar Tschiekey

UNITED STATES PATENT OFFICE.

OSCAR TSCHIEKY, OF NEW YORK, N. Y., ASSIGNOR, BY MESNE ASSIGNMENTS, TO THE NOISELESS AND DRAUGHTLESS DOOR AND WINDOW CUSHION COMPANY, A CORPORATION OF NEW YORK.

DOOR-CHECK.

SPECIFICATION forming part of Reissued Letters Patent No. 12,014, dated July 15, 1902.

Original No. 653,368, dated July 10, 1900. Application for reissue filed January 21, 1902. Serial No. 90,724.

*To all whom it may concern:*

Be it known that I, OSCAR TSCHIEKY, a citizen of the United States, and a resident of the borough of Manhattan, city, county, and State of New York, have invented a new and useful Improvement in Door-Checks, of which the following is a specification.

My invention relates to means for preventing the shock between the meeting and relatively movable parts of a structure and for sealing the joint between the said parts when closed or either of these objects—as, for instance, between a hinged door and its frames; and my invention consists of a resilient or yielding T-shaped strip adapted to a corresponding groove in one of the parts and to make contact with the other part of the structure, as fully set forth hereinafter and as illustrated in one preferred form or embodiment in the accompanying drawings, in which—

Figure 1:
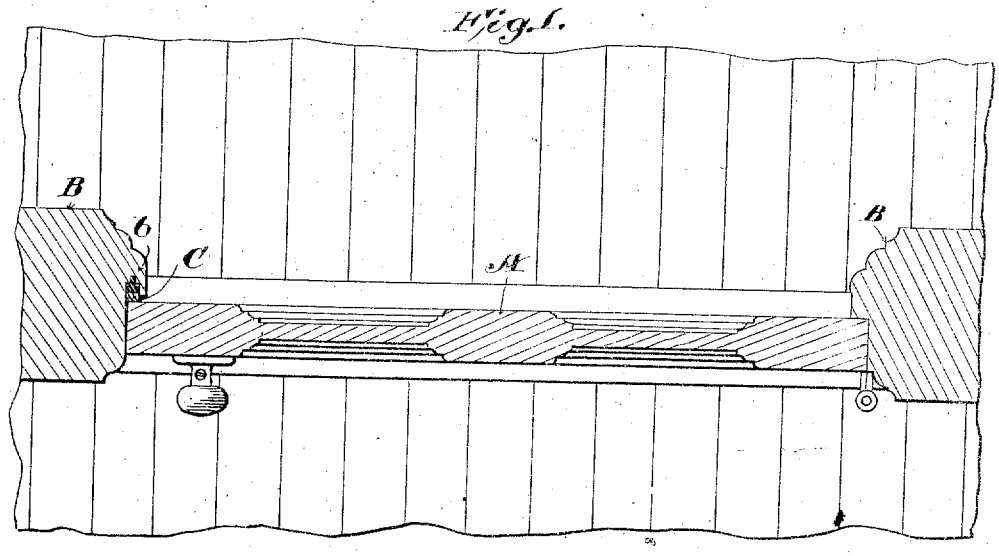
Figure 3:
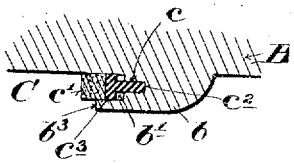
Figure 2:
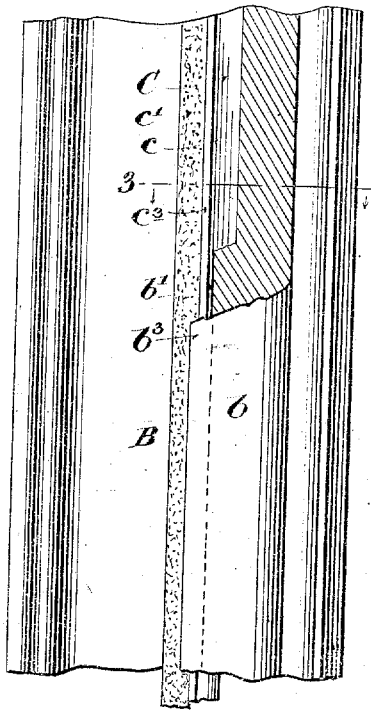

Figure 1 is a cross-sectional view illustrating a door and door frame or case embodying my invention; Fig. 2, a detail view, partly in elevation and partly in section, of a portion of a door-case, showing the buffing and sealing strip applied thereto; and Fig. 3 is a horizontal sectional view taken on the line 3 3 of Fig. 2. Figs. 2 and 3 are drawn to a larger scale than Fig. 1.

Similar letters of reference designate corresponding parts in all of the figures.

A represents a door; B, a door-case in which the door A fits and swings.

*b* represents the rabbet of the door-case, and *b'* a groove or recess substantially of a T-shaped form in cross-section (shown in Fig. 2 of the drawings) provided in said rabbet.

C represents a compressible strip which is held within the groove *b'* by any suitable means.

The door-strip C, as herein shown, is in the form of a strip composed of resilient material. Preferably the strip is made up of a rubber part *c* and a part *c'* of cork, felt, or similar material. The rubber part *c* has a shank $c^2$, which approximately fits in the narrow portion of the groove *b'*, and shoulders $c^3$, which are adapted when the strip is under pressure to abut against the bottom of the wider portion of the groove or recess *b'*. The felt part *c'* is secured to the shoulders and projects beyond the end of the wall $b^3$ of the groove or recess in order that it may receive the impact of the door. The wall $b^3$ serves to prevent any lateral or transverse movement of the strip as the latter slides inward under the impact of the door when the same closes suddenly or under the pressure thereof when it is closed.

The sealing-strip may be placed only on the vertical part of the rabbet, although it is preferable to have it on the upper horizontal portion thereof.

The operation of the device is as follows: The strip being secured by means of its resilient or compressible shank, as seen in Fig. 3, allows the pressing back of the projecting face portions of the strip, so that they may yield to pressure and conform within small limits to the motion of the door or other opposing surface and to any slight unevenness of such surfaces, thus being useful alike for preventing the noise and jar of slamming or rattling of the door or other body, excluding drafts, and effecting a substantially air-tight or dust-proof closure.

Though I have set forth the invention in the preferred form as used for a door-check adapted with either a swinging or sliding door in houses, cabinets, and other relations, obviously the same may be used as a check for window-sashes and as a weather-strip or sealing-strip for various closures without in any way departing from its principles and operation. For this reason I claim the following 1. The combination of a door-frame provided with a groove that has different widths in cross-section, a strip adapted to be retained in said groove, said strip comprising a shank that extends into the narrow portion of the groove and one or more shoulders carried by the said shank, which under compression abut against the bottom of the wider portion of the groove, and a facing for said shoulders and a door mounted to abut against said facing.

2. In combination with a rabbet or member for door-frames and like uses, provided with a groove, a strip comprising a compressible or resilient shank adapted to approximately fit the said groove, one or more shoulders provided on the said shank, and a facing of felt or other soft material for the said shoulders, receiving the abutting surface of a door or other coöperating body, for substantially the purposes set forth.

3. The combination of the rabbet of a door or like frame provided with a groove which has different widths in cross-section, a strip adapted to be retained in said groove and comprising a shank which extends into the narrow portion of the groove, one or more shoulders carried by said shank which under pressure abut against the bottom of the wider portion of the groove and a facing of felt or other soft material for said shoulders against which the door abuts, and a door, substantially as described.

4. In combination with a rabbet or member for door-frames and like uses, provided with a groove, a strip comprising a compressible or resilient shank adapted to approximately fit the said groove, and one or more shoulders provided on said shank in position to normally leave an interval beneath them into which they are adapted to be forced back by an abutting surface, substantially as and for the purposes set forth.

5. The combination of the rabbet for a door-frame or the like provided with a groove which has different widths in cross-section, a strip adapted to be retained within said groove, said strip comprising a shank which extends into the narrower portion of the groove, and one or more shoulders provided on said shank which under pressure abut against the bottom of the wider portion of the groove, and a door, or other movable coöperating body which presses or abuts against said shoulders, for substantially the purposes set forth.

6. The combination with the separable parts of a structure, of a groove in one part having different widths in cross-section, and a compressible strip adapted to be retained in said groove, said strip having a resilient shank which renders the strip as a whole compressible and which extends into the narrower portion of the groove and one or more shoulders provided on said shank which under pressure abut against the bottom of the wider portion of the groove, substantially as described.

In testimony whereof I have signed my name to this specification in the presence of two subscribing witnesses.

OSCAR TSCHIEKY.

Witnesses:
DAVID PEARL,
JAMES BRENNAN.